July 28, 1964 M. A. RAPPEPORT 3,142,805

PULSE REGENERATOR CIRCUIT

Filed Aug. 29, 1960 4 Sheets-Sheet 1

TYPICAL TRANSITIONS WITH A SPACE IN FIRST TIME SLOT

TYPICAL TRANSITIONS WITH A PULSE IN FIRST TIME SLOT

S—INDICATES SLICE LEVEL

A — INDICATES APERTURE OPENING

SUPERIMPOSED WORST CASES

INVENTOR
M. A. RAPPEPORT

BY R. B. Ardis

ATTORNEY

July 28, 1964 M. A. RAPPEPORT 3,142,805

PULSE REGENERATOR CIRCUIT

Filed Aug. 29, 1960 4 Sheets-Sheet 2

TYPICAL TRANSITIONS WITH A SPACE IN FIRST TIME SLOT

INVENTOR
M.A. RAPPEPORT
BY R. B. Ardis
ATTORNEY

TYPICAL TRANSITIONS
WITH A PULSE IN
FIRST TIME SLOT

S— INDICATES SLICE LEVEL
A — INDICATES APERTURE

BIPOLAR SUPERIMPOSED WORST TRANSITIONS

INVENTOR
M. A. RAPPEPORT
BY R. B. Ardis
ATTORNEY

INVENTOR
M. A. RAPPEPORT
BY R. B. Anderson
ATTORNEY

United States Patent Office 3,142,805

Patented July 28, 1964

3,142,805

PULSE REGENERATOR CIRCUIT

Michael A. Rappeport, Plainfield, N.J., assignor to Bell Telephone Laboratories, Incorporated, New York, N.Y., a corporation of New York Filed Aug. 29, 1960, Ser. No. 52,625
3 Claims. (Cl. 328—164)

This invention relates to detection systems and more particularly to systems for the detection of information contained in pulse code form.

In pulse transmission systems one of the most important functions required by the system is the accurate detection of the presence or absence of a pulse. Such detection is required, for example, prior to pulse regeneration or to many of the computational processes involved in digital computers. Accuracy is one of the most important requirements of a pulse detector, for error may result in an inaccurate pulse signal output from a regenerator, or an error in a computational process in a digital computer.

In the prior art the presence or absence of a pulse has generally been determined by detectors which utilize a fixed threshold level. Such detectors recognize a pulse when the incoming signal is greater in magnitude than the fixed level, and consider no pulse or a space to be present when the magnitude of the incoming signal is less than the fixed threshold level. Generally, the threshold level has been set at about one-half the amplitude of the height of an idealized incoming pulse, and this results in opportunity for detection errors. For example, in the absence of a pulse, noise may exceed the threshold level and cause a false pulse to be detected; or when a pulse is present it may be so distorted due to transmission that it fails to exceed the threshold level and no pulse is recognized.

An object of this invention, therefore, is to increase the accuracy of detection of pulse code signals A related object of this invention is to improve the performance of pulse transmission systems at very low cost.

This invention comprises binary data detection means with a varying threshold level. In accordance with this invention the threshold level is set to either of two predetermined levels to detect the presence of a pulse or a space in a given time slot according to whether a pulse or a space was detected in the preceding time slot; thereby reducing the over-all susceptibility of the detection apparatus to noise and transmission effects.

The invention will be more fully comprehended from the following detailed description taken in conjunction with the drawings in which.

Figure 1:
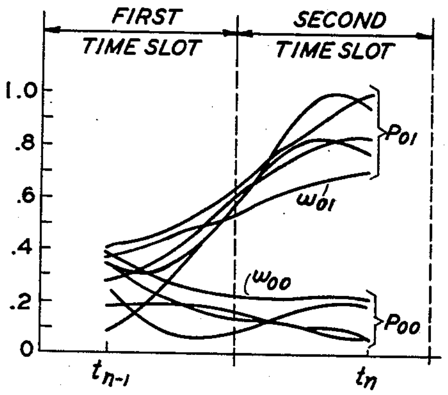
FIG. 1 illustrates two possible families of pulse input transitions when a space was present in the first time slot.

As is well known, a unipolar pulse code signal consists of a train of upulses and "spaces" each occupying a time slot, with the term "space" being used to denote the fact that in a given time slot there is no pulse present. FIG. 1 illustrates a situation where in a first given time slot, at time $t_{n-1}$, there is no pulse present, and shows the two possible families of input signal transitions that exist for the presence of a pulse or a space in the next time slot at time $t_n$. The upper family of curves, $P_{01}$, show the possible transitions when there is a pulse in the second time slot. The pulse in the second time slot may be represented by a signal whose amplitude is relatively low, as shown by the severely distorted curve $W_{01}$; or by curves whose amplitudes are greater than $W_{01}$ as shown above curve $W_{01}$ in FIG. 1. Since the worst indication of a pulse is that which is most likely to lead to an erroneous result in detection, curve $W_{01}$ which has been degraded most by transmission and has the smallest amplitude, is the worst possible transition from a space in the first time slot at time $t_{n-1}$ to a pulse at time $t_n$ in the second time slot as it is the curve least likely to exceed the threshold level.

Since the worst case in a family is the curve most likely to lead to an erroneous result in detection, it is readily observed that the worst indication of a space during the second time slot is that curve, of the family $P_{00}$, which has the greatest amplitude at time $t_n$. In FIG. 1 that curve is denoted $W_{00}$, and it may readily be understood that if the amplitude of the curve $W_{00}$ at time $t_n$ exceeds the threshold level of a detector, a pulse will be falsely detected.

Figure 2:
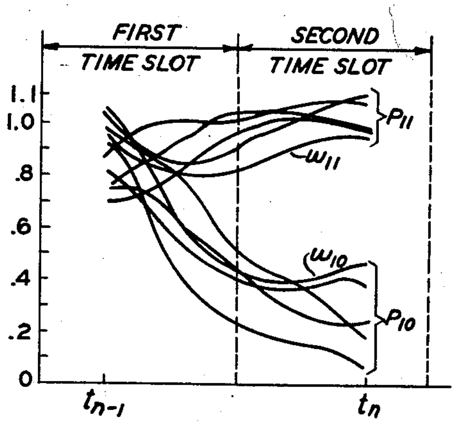
FIG. 2 illustrates two possible families of pulse input transitions when a pulse was present in the first time slot.

The curves shown in FIG. 2 represent two families of input signal transitions, $P_{11}$ and $P_{10}$, where the signal during the first time slot is a pulse and the signal during the second time slot is either a pulse or a space, respectively. Since, as previously explained, the worst case of a particular family of transitions is that which is most likely to yield an erroneous result in detection, the worst case indicating a pulse during the second time slot is curve $W_{11}$ and the worst case indicating a zero is curve $W_{10}$.

In the past the threshold level of the detector has been set at a fixed value which was usually midway between the worst indication for a zero during the second time slot (when the first time slot contained a pulse) and the worst indication of a pulse during the second time slot (when the first time slot contained a space). This level is shown as "S" in FIG. 3 midway between the determining curves $W_{10}$ and $W_{01}$. The distance between the determining curves $W_{10}$ and $W_{01}$ is called the aperture and is denoted by "A" in FIG. 3. When the threshold level is fixed at "S" any noise pulse greater than $A/2$ in magnitude or distortion greater than $A/2$ in magnitude may cause a false indication. For example, a positive noise pulse whose magnitude is greater than $A/2$ added to transition curve $W_{10}$ will cause the amplitude of that curve at time $t_n$ to exceed the threshold level "S" and cause the apparatus to falsely detect the presence of a data pulse at time $t_n$. Similarly, distortion of curve $W_{01}$, which exceeds $A/2$ in magnitude, causes the detection apparatus to falsely detect a "space."

In accordance with this invention the "aperture," or margin of safety, is increased by setting the threshold level in a given time slot, at time $t_n$, to either of two threshold levels in accordance with whether a pulse or space was detected during the preceding time slot, at time $t_{n-1}$. Specifically, in accordance with the invention the threshold level is set during a second time slot to a value midway between the worst indications of a pulse (when the first time slot contained a pulse) and a space (when the first time slot contained a pulse) if a pulse was detected during the first time slot. This threshold level is, in accordance with the "worst" cases previously defined, set midway between curves $W_{11}$ and $W_{10}$ when the first time slot contained a pulse. This threshold level is designated $S_{10-11}$ in FIG. 3 and the resulting aperture is designated $A_{10-11}$. A noise pulse must now be greater than $$\frac{A_{10-11}}{2}$$

in order for a false pulse to be detected in the second time slot at time $t_n$ when the input signal is the worst case $W_{10}$. Similarly, the distortion of the worst case curve $W_{11}$ must be greater than $$\frac{A_{10-11}}{2}$$

in order for a space to be falsely detected. Since $A_{10-11}$ is greater than A there is a greater margin of safety than previously existed.

Figure 3:
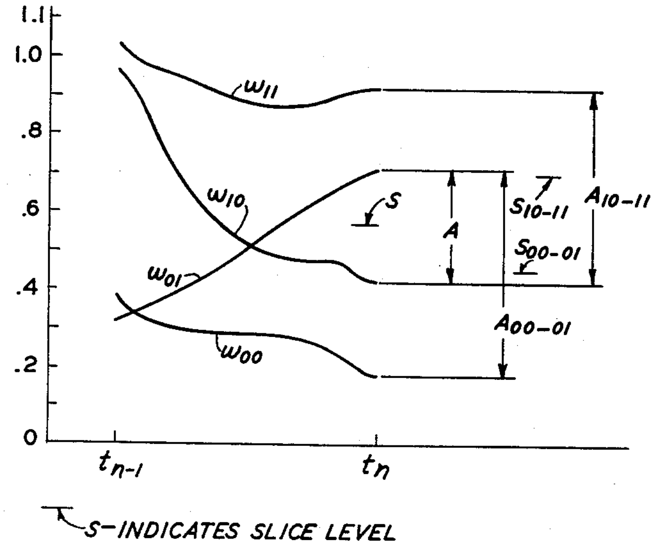
FIG. 3 illustrates, in superimposed fashion, the worst cases of each family of curves in FIGS. 1 and 2.

The threshold level is set midway between the worst case curves, $W_{01}$ and $W_{00}$, value when a space was detected during the first time slot. The resulting threshold level, $S_{00-01}$, is indicated in FIG. 3, and the resulting aperture $A_{00-01}$ is greater than A. This again increases the so-called margin of safety.

Figure 4:
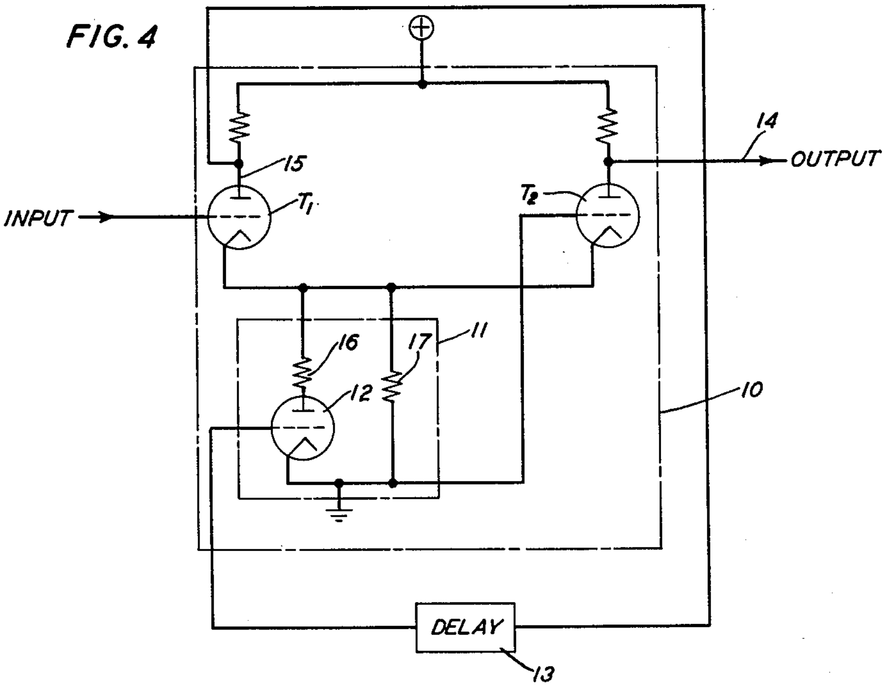
FIG. 4 illustrates a binary data detector embodying the invention.

Detection apparatus embodying applicant's invention is shown in FIG. 4. The apparatus 10 is a cathode coupled binary circuit considering the apparatus 11 to represent a form of cathode resistor. The operation of a cathode coupled binary is well known in the art and is described by Millman and Taub on page 165 of their book "Pulse and Digital Circuits" published by the McGraw Hill Book Company, 1956. In accordance with this invention the level at which an input signal will trigger an output pulse during a given time slot is varied in accordance with whether a pulse or a space appeared in the preceding time slot. Specifically, with reference to the embodiment in FIG. 1, the level at which the cathode coupled binary will trigger is determined by the value of the cathode-ground resistance, which is determined in a given time slot in accordance with whether a pulse or a space occurred during the preceding time slot.

The output of tube $T_1$ is fed to a vacuum tube switch 12 by means of a delay circuit 13 which introduces a delay of about one-half time slot. In the event there is a pulse at the output terminal 14 during a first given time slot then there is no voltage at the plate 15 of tube $T_1$ at that time. As a result vacuum tube switch 12 is open and resistor 16 is isolated from the cathode-ground circuit. Resistor 17 connected between the cathode and ground is the total cathode-ground resistance of the binary and its value is so chosen that the threshold level at which the binary will generate a pulse is $S_{10-11}$ as shown in FIG. 3.

In the event that a "space" has been detected during the first given time slot a pulse will be present at the plate 15 of tube $T_1$ and this delayed pulse when applied to vacuum tube switch 12 will close that switch and lower the effective cathode-ground resistance of the binary by inserting resistor 16 in parallel with resistor 17. The parallel combination of resistors 16 and 17 has a value of resistance such that the binary will now generate a pulse when the input signal exceeds level $S_{00-01}$ as shown in FIG. 3.

Figure 5:
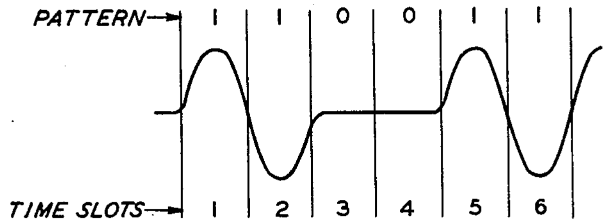
FIG. 5 illustrates a typical bipolar pulse code pattern.

In accordance with this invention the detection of bipolar pulse trains may also be improved. A bipolar pulse train is shown in FIG. 5 and its theory and advantages disclosed by F. T. Andrews in his copending patent application Serial No. 787,535 filed January 19, 1959 now Patent No. 2,996,578. In the bipolar pulse train each space is transmitted as a space in the usual manner, but each pulse is transmitted as a pulse opposite in polarity to the last pulse. FIG. 5 illustrates a pattern occupying six time slots and having the pattern; pulse, pulse, space, space, pulse, pulse. The first pulse is a positive going pulse while the next succeeding pulse is a negative pulse. The spaces in the third and fourth time slots are transmitted as such, but the next occurring pulse in the fifth time slot is a pulse opposite in polarity to that in the second time slot and is, therefore, a positive going pulse. The pulse in the sixth time slot is opposite in polarity to that of the last pulse and is, therefore, a negative going pulse. In short, it may be said that bipolar pulses may be derived from conventional unipolar pulse trains by simply inverting alternate pulses of the unipolar pulse train.

In the prior art two threshold levels are used to detect pulses. A first fixed threshold level is positive and whenever the input signal exceeds that fixed positive value a positive pulse is detected. A second fixed threshold level equal in absolute magnitude to the first but negative in value detects negative pulses, and whenever the input signal is more negative than that fixed negative value a negative pulse is detected. Failure of the input signal to exceed the positive or negative thresholds results in a "space" being detected.

Figure 6:
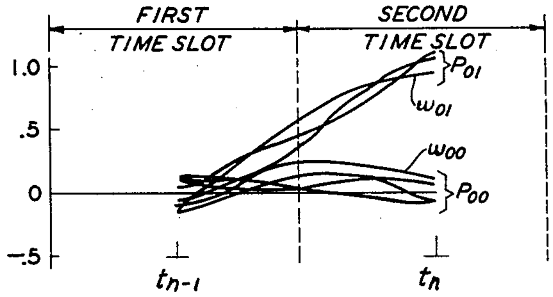
FIG. 6 illustrates two possible families of bipolar pulse input transitions when a space was present in the first time slot.

FIG. 6 is illustrative of two families, $P_{01}$ and $P_{00}$, of bipolar input signal transitions when during a first time slot there is a space and there is either a space or a positive pulse in the second time slot. The worst indication of a positive pulse is curve $W_{01}$ in FIG. 6 since that curve has the least amplitude of any of the curves in its family, $P_{01}$. The worst indication of a space is curve $W_{00}$, since that curve has the greatest amplitude of any of the curves in its family, $P_{00}$.

A similar set of curves could be drawn to illustrate the input signal transitions which occur when there is a space during the first time slot and a negative pulse during the second time slot. These curves would be below the $x$-axis and symmetric to the curves shown in FIG. 6.

Figure 7:
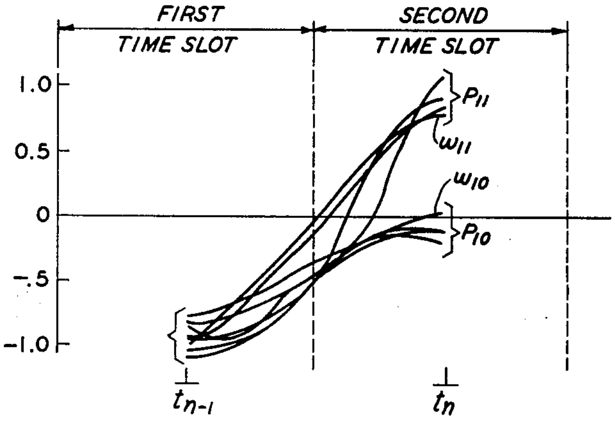
FIG. 7 illustrates two possible families of bipolar pulse input transitions when a negative pulse was present in the first time slot.

FIG. 7 illustrates two families of bipolar input signal transitions $P_{11}$ and $P_{10}$ which exist when there is a pulse of negative polarity in the first time slot, at time $t_{n-1}$, and either a pulse of positive polarity or a space in the second time slot, at time $t_n$, respectively. The family, $P_{11}$, represents a positive pulse in the second time slot, and the family representing a space in the second time slot is labeled $P_{10}$. The worst indication of the former family is $W_{11}$ since it has the least amplitude, and the worst representative of the second family is $W_{10}$ since it has the greatest amplitude.

A similar set of transitions could be drawn for the situation where a positive pulse was present in the first time slot and a negative pulse in the second time slot. The curves so drawn would be below the $x$-axis and symmetric to the curves shown in FIG. 7.

Figure 8:
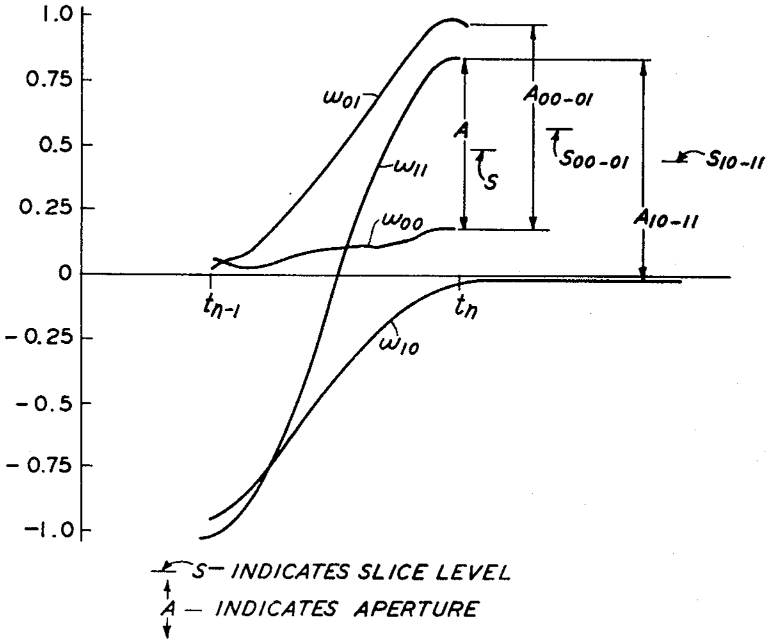
FIG. 8 illustrates, in superimposed fashion, the worst cases of each family of curves in FIGS. 6 and 7.

FIG. 8 shows the superimposed worst cases from FIGS. 6 and 7. In the prior art the positive threshold level is fixed at a value S midway between the worst cases $W_{11}$ and $W_{00}$. This results in an aperture, or margin of safety, A, as shown in FIG. 8. A second threshold level −S, is, of course, also used to detect negative pulses, and this negative threshold level also has an aperture A. When the input signal is greater than the positive threshold level S a positive pulse is detected in the prior art, and when the input signal is more negative than the negative threshold level −S a negative pulse is detected. At all other times a "space" is detected.

In accordance with applicant's invention the threshold level is set to one of two pairs of threshold levels in a given time slot in accordance with whether a pulse, or a space was detected in the preceding time slot. In the event a space was detected during the preceding time slot the positive and negative threshold levels are set to a value equal in magnitude to $S_{00-01}$ shown in FIG. 8. This threshold level is midway between the "worst case" curves $W_{01}$ and $W_{00}$ shown in FIG. 8, and has a resulting aperture $A_{00-01}$. Since $A_{00-01}$ is greater than A the detector is less sensitive to error as a result of noise superimposed on the input signal or distortion of the input signal. Thus, when a space was detected in a given time slot the input signal must be greater than $S_{00-01}$ or more negative than $-S_{00-01}$ during the next time slot for a positive or a negative pulse to be detected.

In the event a pulse was detected during a first given time slot the positive and negative threshold levels during the second time slot are set to a value equal to $S_{10-11}$, shown in FIG. 8, with the resulting apertures equal to $A_{10-11}$. Since the aperture $A_{10-11}$ is always greater than A, there is a resulting improvement in the accuracy of detection. Thus, when a pulse was detected in a given time slot the input signal must be greater than $S_{10-11}$ in the succeeding time slot in order for a positive pulse to be detected, or more negative in magnitude than $-S_{10-11}$ in order for a negative pulse to be detected.

Figure 9:
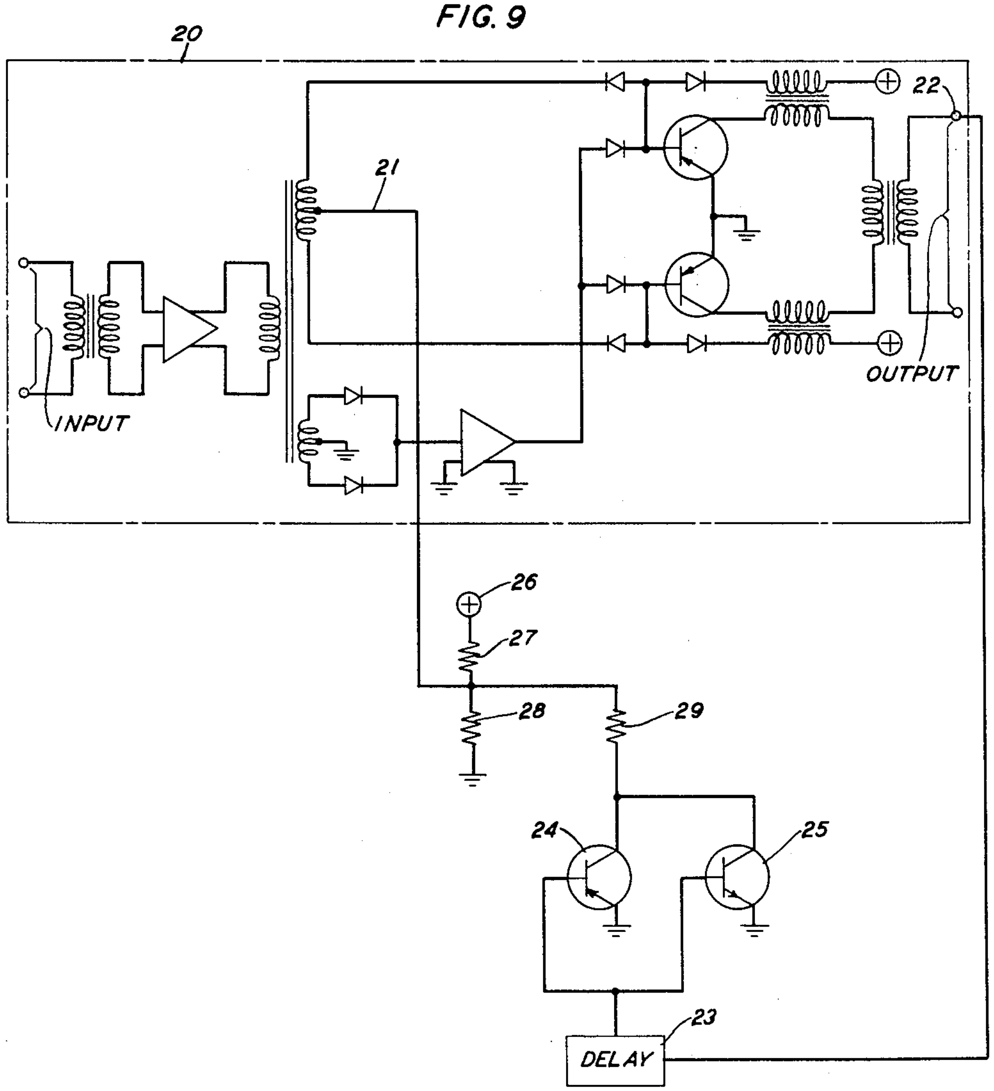
FIG. 9 illustrates a bipolar repeater embodying the invention.

FIG. 9 illustrates a bipolar repeater which has its threshold level determined, in a given time slot, in accordance with whether a pulse or a space appeared in the preceding time slot. The bipolar repeater 20 may be one of the types disclosed by F. T. Andrews in his co-pending application Serial Number 787,535 filed January 19, 1959, and assigned to the present assignee. The particular repeater 20, shown in FIG. 9, is disclosed as FIG. 6 of the Andrews application.

In accordance with the invention, the threshold level at which a pulse will be detected is varied in accordance with whether a pulse or a space is detected during the preceding time slot. Specifically, this is done by varying the bias voltage at terminal 21. One output terminal 22 is connected by means of a delay circuit 23 to the bases of two transistor switches 24 and 25. A positive output pulse will close transistor switch 25 while a negative output pulse will close transistor switch 24. The bias voltage applied to terminal 21 is determined by voltages source 26 and resistors 27, 28 and 29. When a space is detected in a given time slot, transistor switches 24 and 25 will both be open in the succeeding time slot and the voltage at terminal 21 will be determined solely by the relative values of resistors 27 and 28, which are so chosen that the threshold level is set to $+S_{00-01}$ and $-S_{00-01}$ as previously discussed. When a positive or negative pulse was present in a given time slot either transistor switch 24 or transistor switch 25 will be closed during the succeeding time slot inserting resistor 29 in parallel with resistor 28 and lowering the bias voltage applied to terminal 21, so that the threshold levels are now $S_{10-11}$ as previously discussed.

This invention is also applicable to the detection of bipolar pulse trains of the type disclosed by L. A. Meachem in U.S. Patent 2,759,047, issued August 14, 1956.

It is to be understood that the above-described arrangements are illustrative of the application of the principles of the invention. Numerous other arrangements may be devised by those skilled in the art without departing from the spirit and scope of the invention.

What is claimed is:

1. Detection means comprising, in combination, a source of pulse input signals in the form of pulses of opposite polarity and spaces, each space or positive or negative pulse occupying individual ones of a succession of time slots, first means responsive to the amplitude of said input signal which is activated when said input signal exceeds a predetermined positive amplitude, second means responsive to the amplitude of said input signal which is activated when said input signal is more negative than a a predetermined negative amplitude, means to generate a positive pulse when said first responsive means is activated, means to generate a negative pulse when said second responsive means is activated, and means to set the predetermined amplitudes at which both said responsive means become activated to a first absolute value during a given time slot when a positive or negative pulse existed during the preceding time slot and to a second absolute value when a space existed during the preceding time slot.

2. Bipolar pulse regenerating means comprising, in combination, a source of a binary pulse input signal in the form of pulses of opposite polarity and spaces, each space or positive or negative pulse occupying individual ones of a succession of time slots, bipolar pulse regenerating means to generate a positive pulse when said input signal exceeds a predetermined positive amplitude and to generate a negative pulse when said input signal is more negative than a predetermined negative amplitude, and means to set the predetermined amplitudes at which output pulses are generated to a first absolute value during a given time slot when a positive or negative pulse existed during the preceding time slot and to a second absolute value when a space existed during the preceding time slot.

3. A pulse regenerator comprising, in combination, a source of pulse input signals in the form of pulses and spaces, each pulse or space occupying individual ones of a succession of time slots, a bistable circuit having two active transducers and a resistance path connected to corresponding elements of said transducers for coupling said transducers to generate an output pulse when said input signal exceeds an amplitude determined by the resistance value of said resistance path, and means to set the resistance of said resistance path to a first value so that said predetermined amplitude is at a first value during a given time slot when a pulse existed during the preceding time slot, and to set said resistance of said resistance path to a second value so that said predetermined amplitude is at a second value when a space existed during the preceding time slot.

References Cited in the file of this patent

UNITED STATES PATENTS 2,929,927 Beloungie ------------- Mar. 22, 1960
3,028,558 Foglia ---------------- Apr. 3, 1962